United States Patent
Rai et al.

(10) Patent No.: US 7,814,360 B2
(45) Date of Patent: Oct. 12, 2010

(54) SYNCHRONIZING CLUSTER TIME TO A MASTER NODE WITH A FASTER CLOCK

(75) Inventors: Vikram Rai, San Francisco, CA (US); Alok Srivastava, Newark, CA (US)

(73) Assignee: Oralce International Corporation, Redwood Shores, CA (US)

( * ) Notice: Subject to any disclaimer, the term of this patent is extended or adjusted under 35 U.S.C. 154(b) by 908 days.

(21) Appl. No.: 11/698,605

(22) Filed: Jan. 25, 2007

(65) Prior Publication Data

US 2008/0183894 A1  Jul. 31, 2008

(51) Int. Cl.
*G06F 1/12* (2006.01)

(52) U.S. Cl. .................................. 713/400; 370/503
(58) Field of Classification Search .................. 713/400; 370/503
See application file for complete search history.

(56) References Cited

U.S. PATENT DOCUMENTS

| | | | |
|---|---|---|---|
| 5,546,558 A | 8/1996 | Jacobson et al. | |
| 5,680,570 A | 10/1997 | Rantala et al. | |
| 5,724,581 A | 3/1998 | Kozakura | |
| 5,787,445 A | 7/1998 | Daberko | |
| 5,845,313 A | 12/1998 | Estakhri et al. | |
| 5,940,850 A | 8/1999 | Harish et al. | |
| 6,148,377 A | 11/2000 | Carter et al. | |
| 6,351,821 B1 * | 2/2002 | Voth | 713/600 |
| 7,240,065 B2 | 7/2007 | Yang et al. | |
| 7,251,660 B2 | 7/2007 | Yang et al. | |
| 2003/0152110 A1 * | 8/2003 | Rune | 370/509 |
| 2005/0071703 A1 * | 3/2005 | Lee et al. | 713/400 |
| 2005/0144199 A2 | 6/2005 | Hayden | |
| 2005/0237926 A1 * | 10/2005 | Cheng et al. | 370/216 |
| 2005/0256897 A1 | 11/2005 | Sinha et al. | |
| 2005/0278350 A1 | 12/2005 | Yang et al. | |
| 2006/0095591 A1 * | 5/2006 | Kelly | 709/248 |

* cited by examiner

*Primary Examiner*—Thuan N Du
(74) *Attorney, Agent, or Firm*—Hickman Palermo Truong & Becker LLP; Deborah L. Caswell (57) ABSTRACT

Synchronizing cluster time is described. Times of one or more nodes in the cluster to a master node of the cluster are synchronized. It is discovered that a node of a cluster has a clock time that is ahead of a master clock time of the master node. In response to discovering the node with the clock time ahead of the master clock time, the master node is replaced with the node ahead thereof in time, which thus becomes a new master node. The clock times of the cluster nodes are synchronized with the clock time of the new master node.

32 Claims, 7 Drawing Sheets

Example Process for Synchronizing Cluster Time
200

SYNCHRONIZING CLUSTER TIME TO A MASTER NODE WITH A FASTER CLOCK

TECHNOLOGY

The present invention relates generally to time synchronizing. More specifically, embodiments of the present invention relate to synchronizing time in a cluster.

BACKGROUND

A cluster is a multi-node computer system, in which each node comprises a server running on a computer, which may be a server blade. Clusters function as collectively operational groups of servers. The nodes, also called members, of a cluster function together to achieve high server system performance, availability and reliability. For a cluster to function properly, time is synchronized between its nodes. In a clustered database for instance, time synchronicity between members can be significant in maintaining transactional consistency and data coherence.

To achieve time synchronism between cluster members, the clock of one or more cluster members may be adjusted with respect to a time reference. In the absence of an external time source such as a radio clock or a global timeserver, computer based master election processes select a reference "master" clock for cluster time synchronization. A typical master election process selects a cluster member as a master and sets a clock associated locally with the selected member as a master clock. The clocks of the other cluster members are synchronized as "slaves" to the master reference clock.

During cluster operation, the clocks of one or more members may run faster or slower than that of the master. Where the clock of a cluster member runs slower than the master clock, synchronizing that member's clock to that of the master involves advancing the member's clock. Advancing a member's clock is performed sequentially and gradually. Such gradual synchronizing adjustment is rarely problematic. However, when the clock of a cluster member is significantly ahead of the master clock, that clock may be stepped backwards.

Stepping back a clock can lead to confusion in running applications and the operating system (OS). In a real application cluster (RAC) or another cluster of database servers and applications for instance, confusion may arise due to data incoherence, transactional inconsistency and other issues relating to the timing mismatch within the cluster. Such confusion can cause applications to crash, fail or otherwise more or less suddenly cease functioning, and/or the OS to hang or otherwise suspend its normal functioning.

Moreover, on computer clusters where a significant number of member clocks must be stepped back, this situation may be exacerbated. This situation can adversely affect issues relating to the availability, reliability and/or performance of the cluster. Running a mission critical and/or distributed application can become problematic in a cluster so affected.

Based on the foregoing, it could be useful to preclude stepping member clocks backwards to synchronize clock time in a cluster.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Synchronizing cluster time is described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily obscuring the present invention.

Overview

Example embodiments herein relate to synchronizing cluster time. In synchronizing times for one or more cluster nodes to a master node, it is discovered that a node has a clock time that is ahead of a master clock time of the master node. In response to this discovery, the existing master node is replaced with the node that is ahead of the existing master clock time. The node ahead of the earlier master in time becomes a new master node over the cluster. The clock times of the cluster nodes are synchronized with the clock time of the new master node.

In an embodiment, replacing the master node is an atomic operation between the pre-existing (e.g., first) master node and the node ahead thereof in time in which master status, e.g., holding a master or distributed lock, is transferred from the first to the new master node. In an embodiment, the master node is replaced only if one or more criteria are satisfied. For instance, if it is determined that the clock ahead of the existing master clock is a renegade clock (e.g., excessively ahead of a mean cluster time or some other cluster time metric), the master node is not replaced.

The example embodiments described achieve time synchronism in a cluster while obviating stepping a member node clock backwards.

Example Computer Cluster

Figure 1:
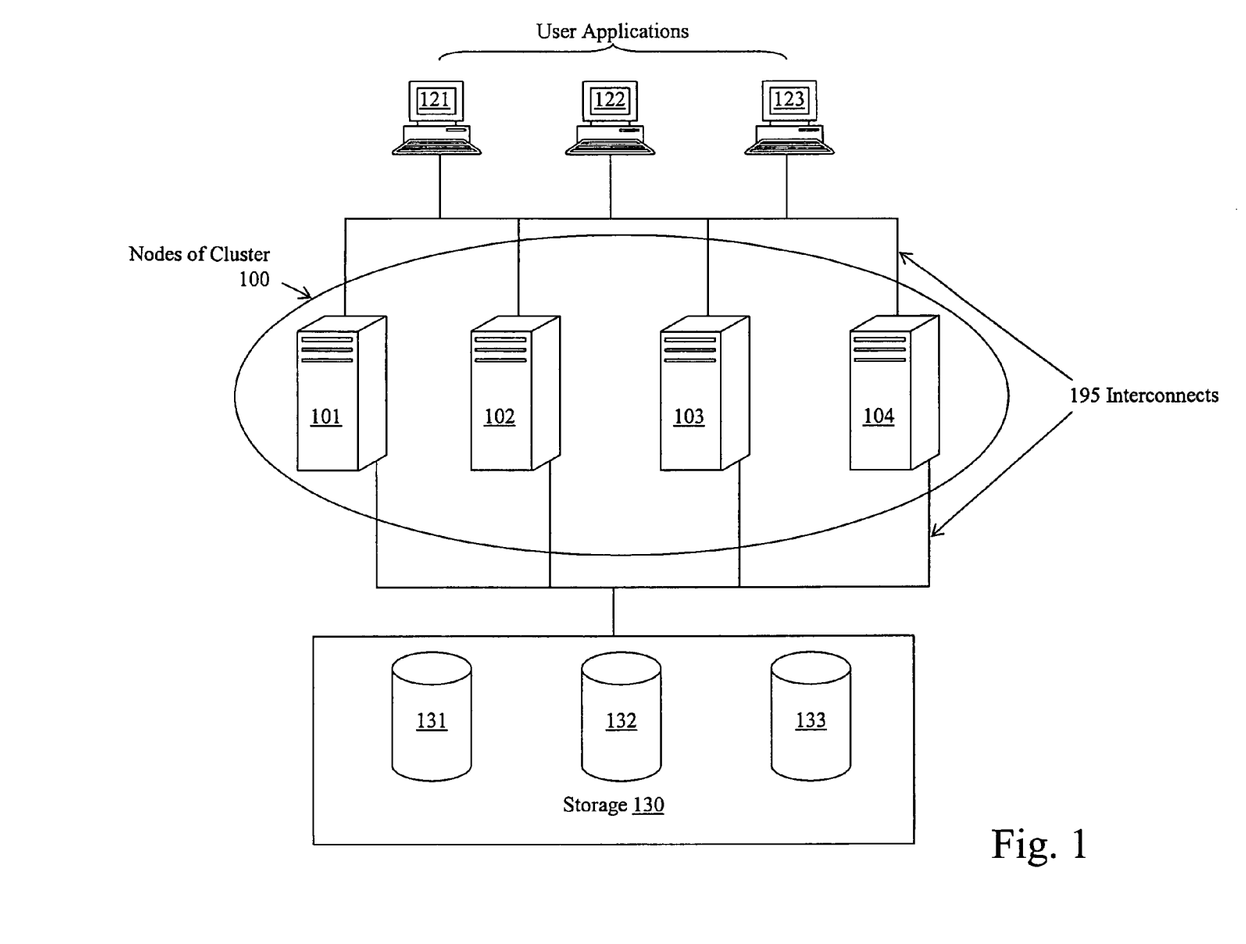
FIG. 1 depicts an example computer cluster, with which an embodiment of the present invention may be used.

FIG. 1 depicts an example computer cluster 100, according to an embodiment of the present invention. Cluster 100 comprises computers 101, 102, 103 and 104, interconnected to support a master slave client server architecture for supporting multiple distributed applications 121, 122 and 123. One of the computers of cluster 100 functions as a master node and the others function as slave nodes. While any one of the computers 101-104 can function as a master node of cluster 100, only one of them may be master at a given time. The master node acquires and holds control over a distributed lock service in cluster 100, which synchronizes access to shared resources between the nodes.

Each of the nodes 101-104 has a clock associated therewith that keeps a local time associated with that node. Such a clock may be implemented in the hardware of each computer, for example with an electronic oscillator. The clock associated with the master node functions as a master clock for cluster 100.

The computers 101-104 of cluster 100 are networked with interconnects 195, which can comprise a hub and switching fabric, a network, which can include one or more of a local area network (LAN), a wide area network (WAN), an internetwork (which can include the Internet), and wire line based and/or wireless transmission media.

While four computers are shown in the example depicted in FIG. 1, it should be appreciated that virtually any number of computers can be interconnected as nodes of cluster 100. The four example computers shown are depicted by way of illustration, description and simplification and in no way by limitation.

Computers 101-104 may be configured as clustered database servers. So configured, cluster 100 can implement a real application cluster (RAC), such as are available commercially from Oracle™ Corp., a corporation in Redwood Shores, Calif. Such RAC clustered database servers can implement a foundation for enterprise grid computing and/or other solutions capable of high availability, reliability, flexibility and/or scalability. The example RAC 100 is depicted by way of illustration and not limitation.

Cluster 100 interconnects the distributed applications 121-122 to information storage 130, which includes example volumes 131, 132 and 133. Storage 130 can include any number of volumes. Storage 130 can be implemented as a storage area network (SAN), a network area storage (NAS) and/or another storage modality.

Example Process for Synchronizing Cluster Time

Figure 2:
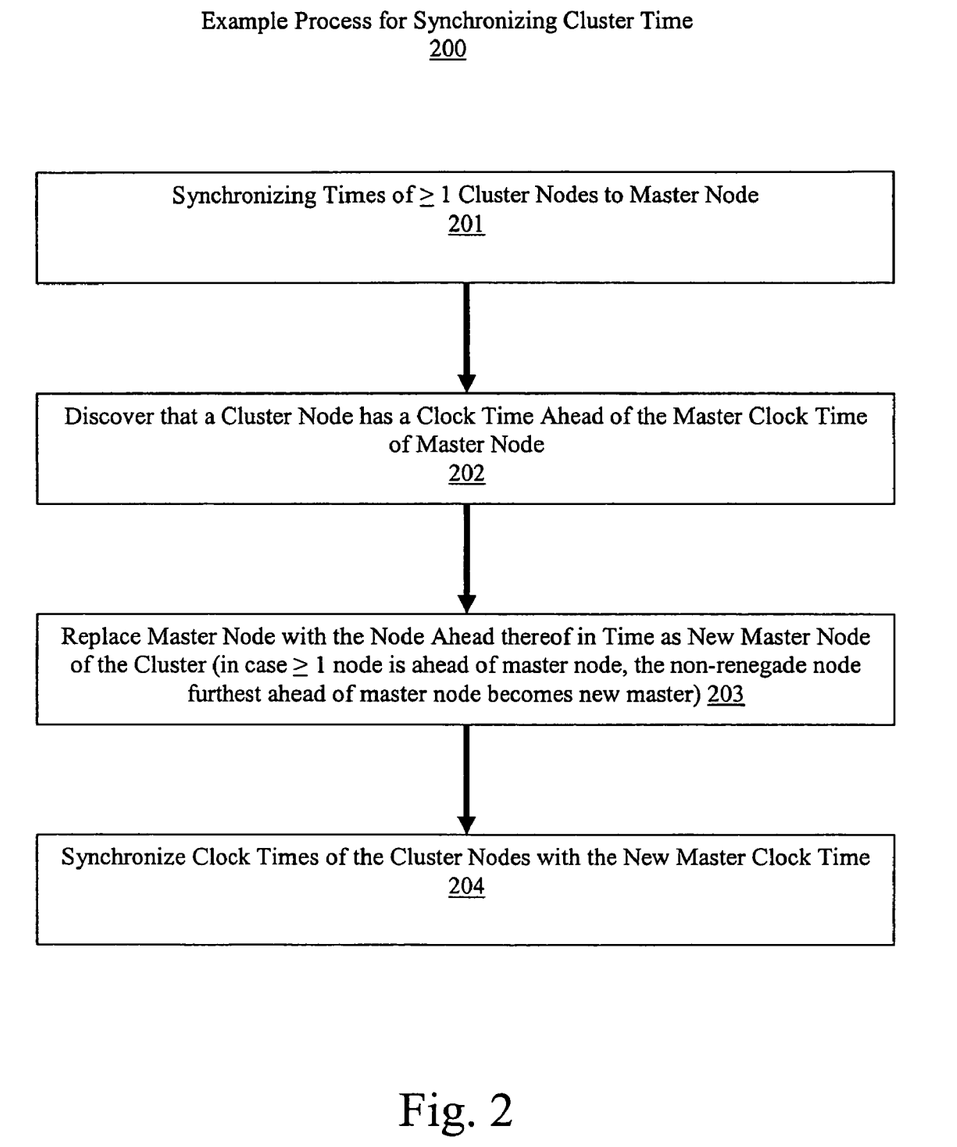
FIG. 2 depicts an example process for synchronizing cluster time, according to an embodiment of the invention.

FIG. 2 depicts an example process 200 for synchronizing cluster time, according to an embodiment of the invention. Process 200 functions to synchronize clock times between the nodes of a cluster (e.g., cluster 100; FIG. 1). In block 201, the clock times of one or more cluster nodes are synchronized to the master clock time of an original master node of the cluster. The original master node is whichever node is functioning, initially, with a master role in the cluster; in other words, a pre-existing or first master node.

In block 202, it is discovered that a cluster node has a clock that is ahead of the master clock in time. This discovery can occur as the node joins the cluster or during exchange of time synchronizing messages between the node and the master.

In block 203, in response to this discovery, the master node is replaced within the cluster. The original master node relinquishes its status as master node (e.g., master status, mastership, etc.), which in an embodiment is atomically transferred from the original master node to the node that was discovered ahead thereof in time. Where more than one node is ahead of the original master, the node that is ahead thereof the furthest, yet which is not a renegade, is selected as the new master.

In some embodiments, the master node replacement, described with reference to block 203, is performed only if one or more criteria are satisfied. In an embodiment, one such criterion is based on how advanced the node discovered ahead in time is. This criterion may be implemented with comparison of the clock time of the node discovered ahead of the original master to a mean time of the clocks of the cluster nodes, e.g., a mean cluster time.

The criterion may be deemed satisfied where the clock time of the node discovered ahead of the original master is within a acceptable range, which can be within two standard deviations, of the mean cluster time. Other statistical metrics may also or alternatively be used. Where the criteria are not satisfied, the original master node is not replaced. This prevents a node whose clock fails to satisfy the criteria from becoming a renegade master, which could cause confusion in the cluster. These criteria can also be used to deter a new node from joining the cluster and/or to foster nodes joining the cluster adjusting their clocks to an acceptable value prior to being allowed to join the cluster.

However, where the criteria are satisfied, the original master node is replaced with the node ahead thereof, which becomes the new master node in the cluster. In block 204, the clock times of the other cluster nodes are synchronized with the new master clock time. The clocks of the other nodes of the cluster are adjusted to correspond with the clock time associated with the node to which the master status has been transferred. This synchronization may involve incremental, gradual forward adjustments, with which the clocks of the other nodes are brought forward in time to match the master clock. However, embodiments of the present invention do not step cluster node clocks backwards.

Example System for Synchronizing Cluster Time

Figure 3:
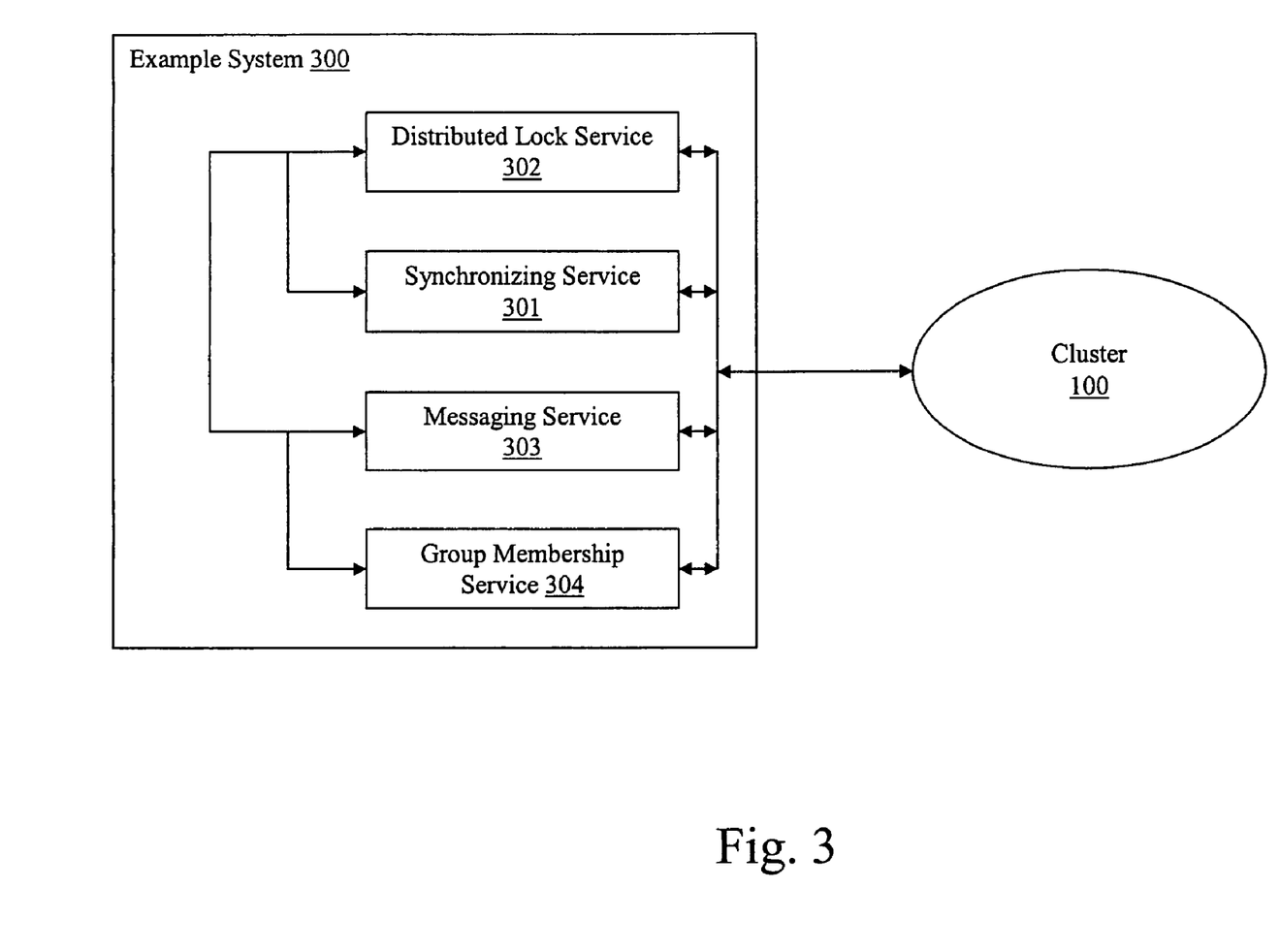
FIG. 3 depicts an example cluster time synchronizing system, according to an embodiment of the invention.

FIG. 3 depicts an example cluster time synchronizing system 300, according to an embodiment of the invention. A synchronizing process such as process 200 (FIG. 2) is performed with synchronizing system 300 for computer cluster 100. In an embodiment, system 300 includes elements of a relational database management system (RDBMS). In an embodiment, system 300 is disposed or deployed with a cluster system.

In an embodiment, a function of synchronizing system 300 is implemented with processing functions performed with one or more of computers 101-104 of cluster 100. In an embodiment, synchronizing system 300 is configured with software that is stored with a computer readable medium and executed with processors of a computer system.

Timekeeping and other clock and synchronism related functions of system 300 are performed with a synchronizing service 301. In an embodiment, synchronizing service 301 functions to calculate time offsets between the master clock of a master node of cluster 100 and the clocks of one or more slave nodes thereof.

A messaging service 303 functions with synchronizing service 301 and allows the nodes of cluster 100 to intercommunicate. Messaging service 303 provides a multipoint-to-point mechanism within cluster 100, with which processes running on one or more of the nodes 101-104 can communicate and share data. Messaging service 303 may write and read messages to and from message queues, which may have alternative states of persistence and/or the ability to migrate. In one implementation, upon failure of an active process, a standby process processes messages from the queues and the message source continues to communicate transparently with the same queue, essentially unaffected by the failure.

A group membership service 304 functions with messaging service 303 and provides all node members of cluster 100 with cluster event notifications. Group membership service 304 may also provide membership information about the nodes of cluster 100 to applications running therewith. Subject to membership strictures or requirements that may be enforced with group membership service 304 or another mechanism, nodes may join and leave cluster 100 freely. Since nodes may thus join or leave cluster 100 at any time, the membership of cluster 100 may be dynamically changeable.

As the membership of cluster 100 changes, group membership service 304 informs the nodes of cluster 100 in relation to the changes. Group membership service 304 allows application processes to retrieve information about the membership of cluster 100 and its nodes. Messaging service 303 and/or group membership service 304 may be implemented with one or more Ethernet or other LAN functions.

Distributed lock service 302 functions with the synchronizing service 301 and coordinates the distribution of locks that function between the nodes of cluster 100 for access to shared data and controlling competition between processes, running in different nodes, for a shared resource. Distributed lock service 302 provides locks, which are claimed and released individually. Distributed lock service 302 supports locks that allow exclusive access (as for writing to a database) and locks that allow shared access (as for reading from a database). In an embodiment, distributed lock service 302 functions as a distributed lock manager (DLM), which provides distributed applications with a means to synchronize their access to shared resources.

In an embodiment, a node becomes the master node in cluster 100 with the action of successfully acquiring a master lock or a distributed lock via a DLM and operating in a master mode. Upon a node achieving master status in cluster 100, synchronizing service 301 functions to synchronize the clock times of the slave nodes with the clock of the master node, e.g., the master clock.

Example Process for Deterring Renegade Masters

Figure 4A:
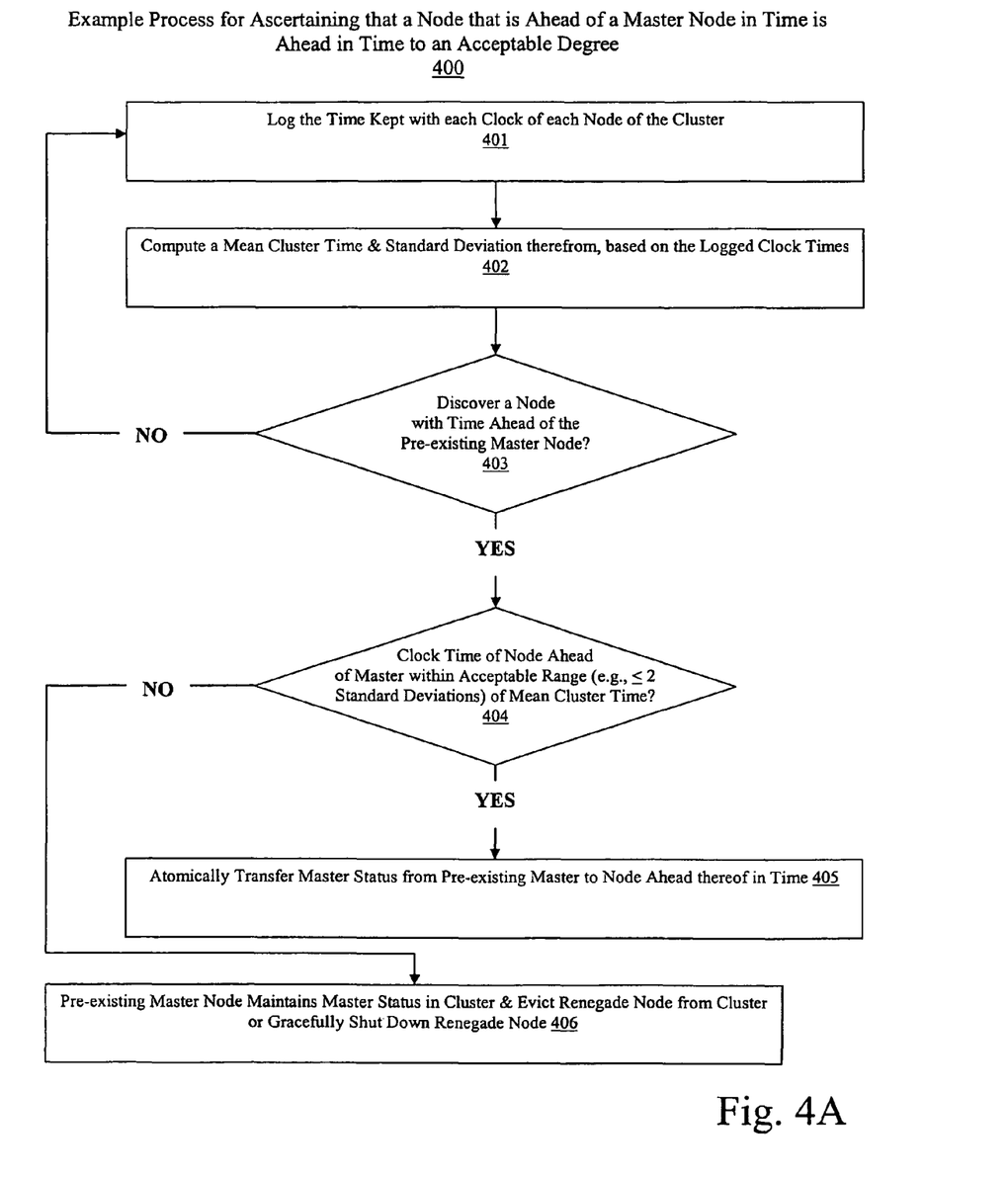
FIG. 4A depicts an example process for ascertaining that a node that is ahead of a master node in time is ahead in time to an acceptable degree, according to an embodiment of the invention.

FIG. 4A depicts an example process 400 for ascertaining that a node that is ahead of a master node in time is ahead in time based on one or more criteria, according to an embodiment of the invention. In an embodiment, one such criterion is determining that the node ahead of the master node in time is ahead in time to an acceptable degree and thus does not have, for example, a so-called renegade clock. In the event that a node is discovered to be ahead of a pre-existing master clock in time, a determination is made in an embodiment as to the suitability of that node becoming master of a cluster. Where the clock of that cluster is so far ahead of the clocks of other cluster nodes that synchronizing therewith could be impracticable, the fast running clock is referred to as a renegade clock. An embodiment functions to deter adoption of a node with a renegade clock (e.g., a renegade node) as a master of a cluster. In another embodiment, other criteria may be used to make the suitability determination for prospective mastership of a node.

In block 401, the time kept by the clocks of each node of the cluster is logged. In block 402, a mean cluster time, and a standard deviation therefrom, are computed based on the logged clock times. In block 403, it is determined whether a node is discovered with a clock time that is ahead of that of the pre-existing master node.

If no clock is found ahead of the cluster master in time, logging of the clock times of the member nodes of the cluster continues. However, where it is determined that a node is discovered with a clock time that is ahead of that of the pre-existing master node, in block 404 it is determined whether the clock time of the node ahead of the pre-existing master clock is within an acceptable range of the mean cluster time.

In an embodiment, determining whether the clock time of the node ahead of the pre-existing master clock is within an acceptable range of the mean cluster time comprises a statistical computation. In one implementation, the acceptable range can comprise a value within a certain number of standard deviations (e.g., one or two) from the mean cluster time.

Where it is determined that the clock time of the node ahead of the pre-existing master clock is within an acceptable range of the mean cluster time, in block 405 the master status is atomically transferred from the pre-existing master to the node acceptably ahead thereof in time. However, where it is determined that the clock time of the node ahead of the pre-existing master clock is outside of the acceptable range from the mean cluster time, in block 406 the step of transferring master status thereto is deterred, which deters a cluster from having renegade mastership. An embodiment thus provides for handling renegade nodes (e.g., a node with a renegade clock).

Figure 4B:
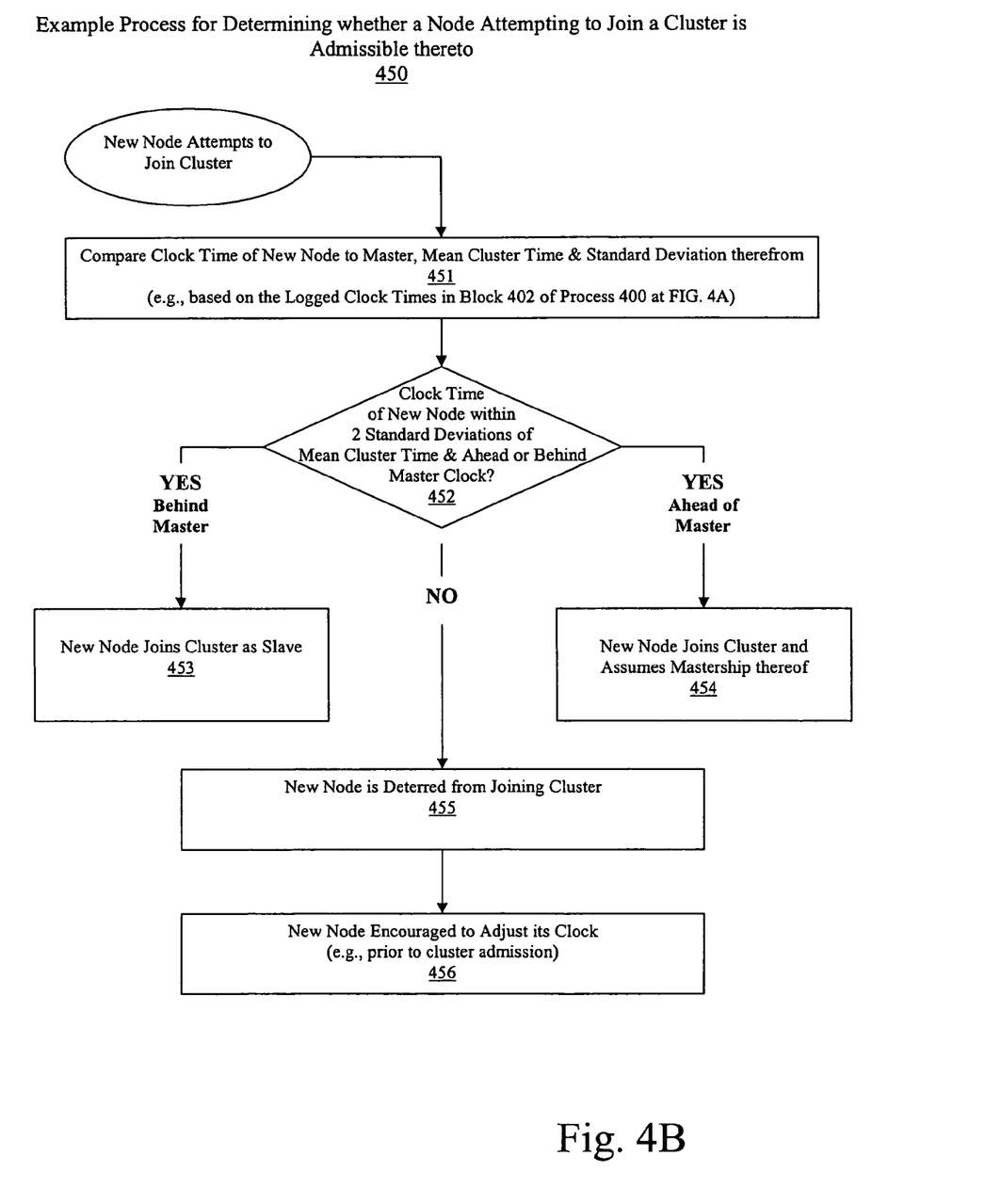
FIG. 4B depicts an example process for determining whether a node attempting to join a cluster will be admitted thereto, according to an embodiment of the invention.

FIG. 4B depicts an example process 450 for determining whether a node attempting to join a cluster will be admitted thereto, according to an embodiment of the invention. In the event of a new node attempting to join the cluster, in block 451 the clock time of the new node's clock time is checked and compared to the mean cluster time. Where the clock time of the node attempting to join the cluster is within two standard deviations of the mean cluster time in block 452 the node attempting to join the cluster is admitted thereto as a new node. Where the clock of the joining node is behind the master clock in time, in block 453 the new node assumes slave status in the cluster. Where the clock of the joining node is ahead of the master clock in time, in block 454 the new node joins and assumes master status over the cluster.

However, where the clock time of the node attempting to join the cluster is more than two standard deviations from the mean cluster time, in block 455, the node attempting to join the cluster is deterred from cluster membership (e.g., its attempt to join the cluster is refused). The node attempting to join the cluster can be encouraged in block 456 to adjust its clock (e.g., to within two standard deviations from the mean cluster time), prior to (e.g., as a condition of) being allowed to join the cluster.

Referring again to FIG. 4A, a node that is an existing cluster member may become a renegade node (e.g., the node's clock drifts such that its time exceeds the mean cluster time by more than two standard deviations). In such an event, the emergent renegade node may be evicted from the cluster in 406 or shut down gracefully.

The clock of a node that is an existing cluster member may become ahead of the cluster master, yet without exceeding two standard deviations from the mean cluster time. In such an event, the node with a clock that is furthest ahead of the master clock in time, yet without exceeding two standard deviations from the mean cluster time, is elected as a new cluster master.

Where a cluster has only two nodes, it may be impracticable to verify a renegade clock. For a cluster with more than two nodes however, a pre-existing master that detects a slave so far ahead in time that it is beyond the acceptable range of the mean cluster time does not relinquish its lock thereto. In an embodiment however, where a master records the same detection for more than one slave node, the master may determine that its own clock is suspect and, based on that determination, relinquishes mastership. In one implementation, the group membership service, in response to the master relinquishing, randomly selects a new master from the other nodes.

Example Process for Synchronizing with Lock Control Transfer

Figure 5:
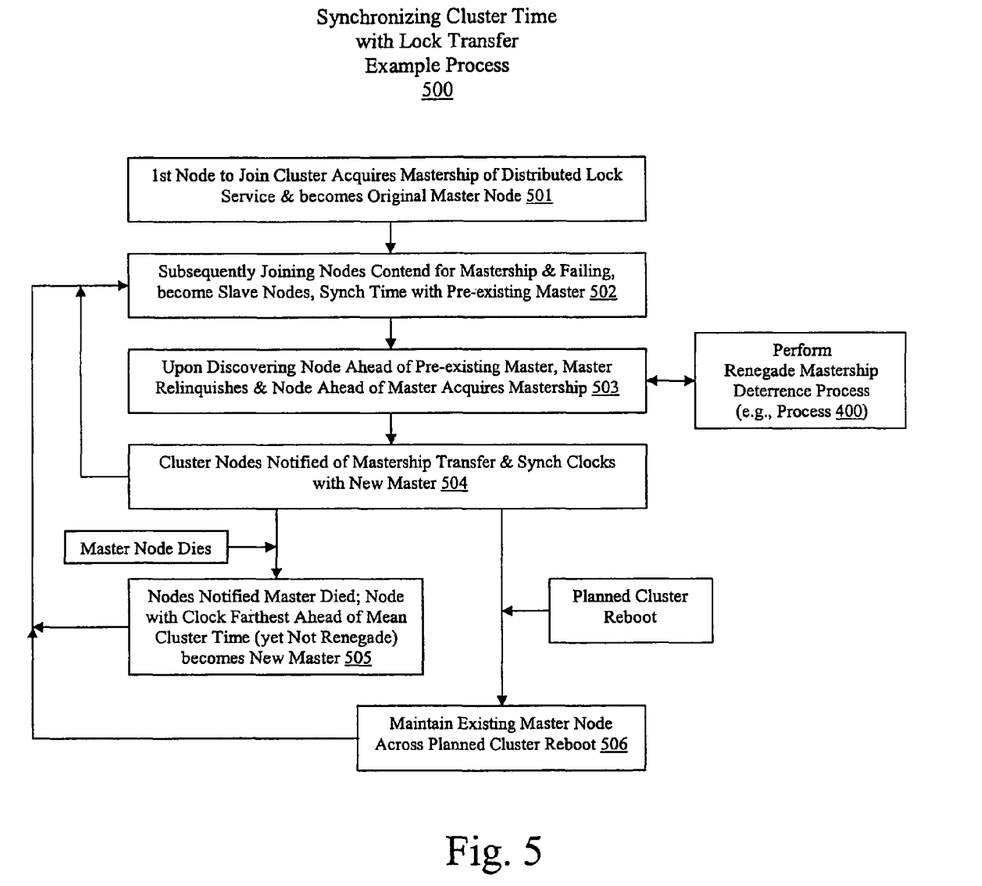
FIG. 5 depicts an example process for synchronizing cluster time with lock control transfer, according to an embodiment of the invention.

FIG. 5 depicts an example process 500 for synchronizing cluster time with transfer of mastership over lock distribution, according to an embodiment of the invention. In an embodiment, process 500 is performed with a cluster synchronizing system with a distributed lock service. For instance, process 500 may be implemented with system 300 (FIG. 3), which has distributed lock service 302.

In a cluster (e.g., cluster 100; FIG. 1), every member node can operate in one of two modes: either as a master or as a slave. In block 501, the first node to join a cluster becomes master thereof (e.g., operates in a master mode and functions as a pre-existing master node for the cluster). Mastership (e.g., master status) over the cluster includes acquisition of the master lock (e.g., from a DLM).

In block 502, each node that subsequently tries to join the cluster contends for the mastership. Upon failure to acquire mastership, the subsequently joining node operates in slave mode and synchronizes its clock time with that of the master node. In one implementation, the slave synchronizes its clock time with the master clock with periodic time synchronizing messages and a clock adjusting process.

The periodic time synchronizing messages allow the master and the slave to calculate time offsets between each other. Upon discovery that the clock time of a slave node is ahead of its own clock in time, the pre-existing master node in block 503 relinquishes the master or distributed lock and the slave node ahead thereof in time acquires the lock therefrom. In an embodiment, the relinquishment of the mastership by the pre-existing master node and the acquisition of the mastership with the slave node ahead thereof in time comprises an atomic operation. In various implementations, the original master can instruct the slave ahead thereof in time to acquire the master lock via the messaging service or the group membership service.

In block 504, the group membership service notifies all nodes of the cluster of the new master node and the slave nodes exchange time synchronization messages with the new master. Their clock times thus synchronize with the new master clock time, as in block 502. Blocks 502-504 are repeated recursively until a new node, whose clock time is ahead of the current master clock, becomes master of the cluster.

In an embodiment, a renegade mastership deterrence process such as process 400 (FIG. 4) is performed with process 500. During execution of block 503 for example, upon discovery of a node ahead of the master clock in time, process 500 is performed prior to executing block 504. Where that node is within an acceptable range of the mean cluster time, block 504 is executed. However, where that node is outside of an acceptable range of the mean cluster time, execution of block 504 is deterred and the pre-existing master node maintains its master status in the cluster. Blocks 502-504 may then be repeated.

In an embodiment, during the first formation of a computer cluster, the first node to join the cluster and subsequently acquire the master lock becomes the master of the cluster. In the event of a planned cluster reboot, the cluster mastership can remain the same for the next incarnation of the cluster.

In an embodiment, in the event of the death of a master node (e.g., in which an existing master node ceases to function as an operational node of the cluster), block 505 is executed, in which the group membership service notifies the member cluster nodes of the death of the master event and a member node with a clock farthest ahead of the mean cluster time, yet within two standard deviations (and/or compliant with another criterion) thereof assumes mastership over the cluster.

Example Computer System Platform

Figure 6:
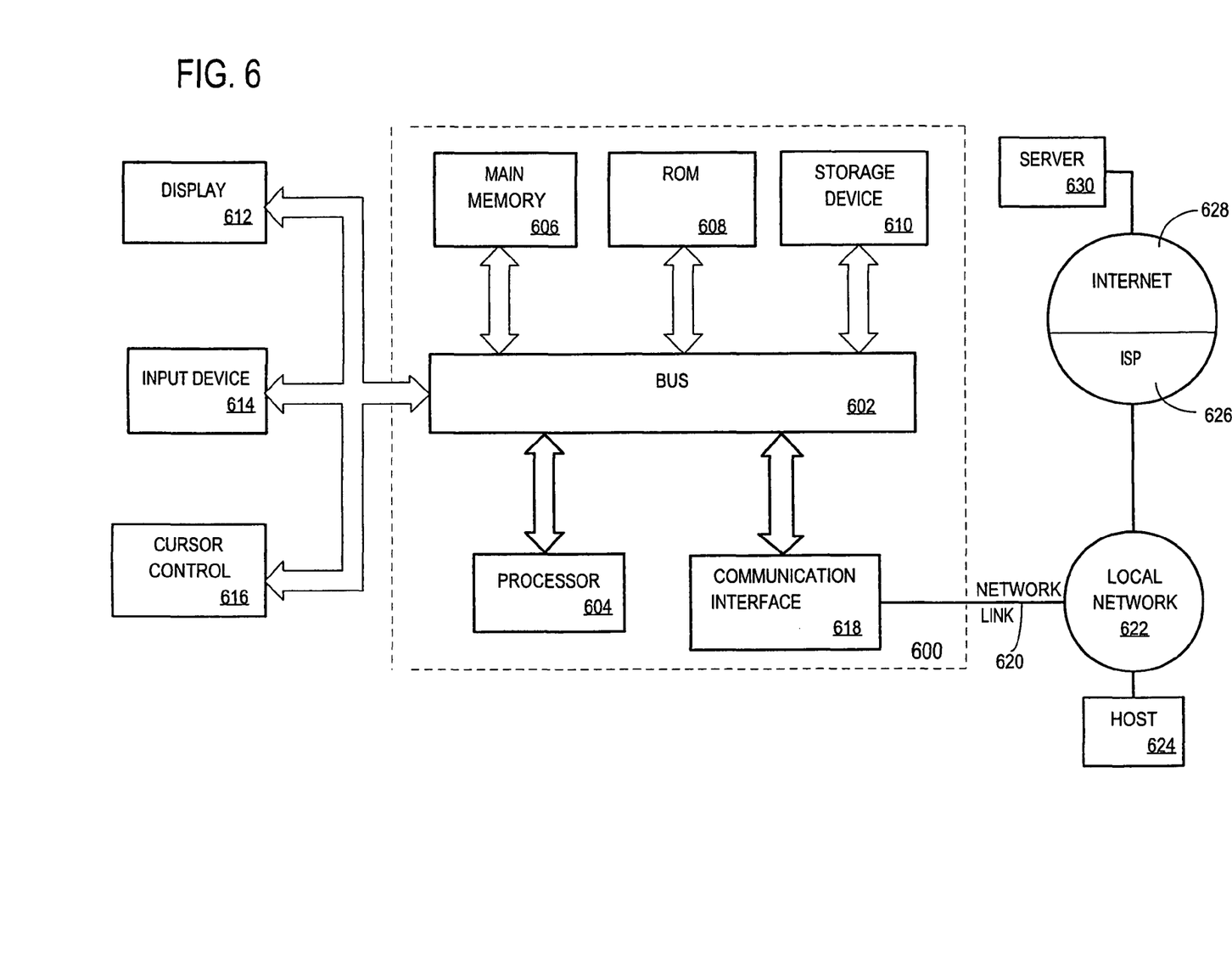
FIG. 6 depicts an example computer system platform, with which an embodiment of the present invention may be practiced.

FIG. 6 illustrates an example of a computer system 600 upon which an embodiment of the invention may be implemented. Computer system 600 includes a bus 602 or other communication mechanism for communicating information, and a processor 604 coupled with bus 602 for processing information.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a liquid crystal display (LCD), a cathode ray tube (CRT) or the like, for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to an embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, legacy and other media such as punch cards, paper tape or another physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a digital subscriber line (DSL), cable or other modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

Equivalents, Extensions, Alternatives and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for synchronizing time in a computer cluster of nodes, comprising the steps of:
    synchronizing times of one or more nodes in the cluster to a master node of the cluster;
    discovering a node of the cluster has a clock time that is ahead of a master clock time of the master node;
    in response to discovering the node with the clock time ahead of the master clock time, replacing the master node with the node ahead thereof in time as a new master node; and
    synchronizing the clock times of the nodes in the cluster with the clock time of the new master node;
    wherein the steps are performed by one or more nodes in the cluster.

2. The method as recited in claim 1 wherein the replacing step is performed atomically between the original master node and the node ahead thereof in time.

3. The method as recited in claim 1 wherein the replacing step is performed when one or more criteria are satisfied.

4. The method as recited in claim 3 wherein one of the criteria is based on how advanced the clock of the node ahead of the original master node is, in relation to the other nodes in said cluster.

5. The method as recited in claim 4 wherein one of the criteria is based on the mean time of the clocks of the nodes in the cluster.

6. The method as recited in claim 4 further comprising, upon the master node leaving the cluster:
    informing the nodes of the master leaving the cluster;
    determining which of the remaining nodes has a clock furthest ahead wherein the clock conforms to the criteria; and
    transferring master status to the node with the conforming clock furthest ahead.

7. The method as recited in claim 4 further comprising, upon determining that a node does not conform to the criteria,
    evicting the non-conforming node from the cluster; or
    performing a graceful shutdown on the non-conforming node.

8. The method as recited in claim 4 further comprising, upon discovering that more than one node is ahead of the master:
    determining which node of the more than one nodes is furthest ahead and in conformance with the criteria; and
    replacing the master node;
    wherein the node that is furthest ahead and in conformance with the criteria becomes the new master.

9. The method as recited in claim 4 further comprising, upon detecting that a new node is attempting to join the cluster:
    determining whether a clock of the new node conforms to the criteria; and upon determining that the clock of the new node conforms to the criteria, allowing the new node to join the cluster; and upon determining that the clock of the new node fails to conform to the criteria, deterring the new node from joining the cluster.

10. The method as recited in claim 9, wherein discovering a node of a cluster has a clock time that is ahead of the master clock time comprises:

detecting that the new node has the clock ahead of the master clock in time upon that node joining the cluster;

wherein replacing the master node comprises replacing the master node with the new node.

11. The method as recited in claim 10, wherein replacing the master node further comprises:

notifying all other nodes in the cluster that the joining node has achieved the master status;

wherein the other nodes function as slave nodes.

12. The method as recited in claim 1, wherein synchronizing times comprises:

exchanging synchronization messages between the master node and the slave nodes;

based on data in the synchronization messages, calculating a time offset between the clock of a particular slave node and the master clock; and upon the time offset indicating that the clock of the particular slave node is behind the master clock in time, adjusting the clock of the particular slave node to agree with the master clock.

13. The method as recited in claim 1 wherein, upon initial formation of the cluster, a first node to join the cluster becomes the master and, upon a subsequent node joining the cluster, the subsequent node becomes a slave.

14. The method as recited in claim 1 wherein, upon a cluster reboot, the master node before the reboot remains the master node upon performing the reboot.

15. A method for synchronizing time in a computer cluster of nodes, comprising the steps of:

monitoring the clock times of the nodes in the cluster in relation to that of a first master node;

discovering that a node of a cluster has a clock time that is ahead of a master clock time of the first master node;

ascertaining that the node that has a clock time that is ahead of the first master clock in time is ahead in time to a degree that satisfies one or more criteria;

in response to ascertaining that the node with a clock time that is ahead, atomically transferring a master status from the first master node to the node ahead thereof in time wherein the node ahead in time becomes a new master node of the cluster and the clock time of the new master node becomes a new master clock time of the cluster;

synchronizing the clock times of other nodes in the cluster with the new master clock time; and iteratively repeating the transferring step based on the discovering step;

wherein the steps are performed by one or more nodes in the cluster.

16. The method as recited in claim 15 wherein, the ascertaining comprises:

logging the time kept with each clock of nodes in the cluster;

computing a mean cluster time based on the time logged for said each clock of nodes in the cluster; and determining that the clock time of the node ahead of the pre-existing master clock is within a range of the mean cluster time.

17. A computer readable volatile or non-volatile storage medium storing instructions encoded therewith which, when executed with one or more processors of a computer system, cause the processors to execute:

synchronizing times of one or more nodes in the cluster to a master node of the cluster;

discovering a node of a cluster has a clock time that is ahead of a master clock time of the master node;

in response to discovering the node with the clock time ahead of the master clock time,
replacing the master node with the node ahead thereof in time as a new master node; and synchronizing the clock times of the nodes in the cluster with the clock time of the new master node.

18. The computer readable volatile or non-volatile storage medium of claim 17, wherein replacing the master node is performed atomically between the original master node and the node ahead thereof in time.

19. The computer readable volatile or non-volatile storage medium of claim 17, wherein replacing is performed when one or more criteria are satisfied.

20. The computer readable volatile or non-volatile storage medium of claim 19, wherein one of the criteria is based on how advanced the clock of the node ahead of the original master node is, in relation to the other nodes in said cluster.

21. The computer readable volatile or non-volatile storage medium of claim 20, wherein one of the criteria is based on the mean time of the clocks of the nodes in the cluster.

22. The computer readable volatile or non-volatile storage medium of claim 20, the instructions further comprising instructions, which when executed by the one or more processors, cause:

upon the master node leaving the cluster:
informing the nodes of the master leaving the cluster;
determining which of the remaining nodes has a clock furthest ahead wherein the clock conforms to the criteria; and
transferring master status to the node with the conforming clock furthest ahead.

23. The computer readable volatile or non-volatile storage medium of claim 20, the instructions further comprising instructions, which when executed by the one or more processors, cause:

upon determining that a node does not conform to the criteria,
evicting the non-conforming node from the cluster; or
performing a graceful shutdown on the non-conforming node.

24. The computer readable volatile or non-volatile storage medium of claim 20, the instructions further comprising instructions, which when executed by the one or more processors, cause:

upon discovering that more than one node is ahead of the master:
determining which node of the more than one nodes is furthest ahead and in conformance with the criteria; and
replacing the master node;
wherein the node that is furthest ahead and in conformance with the criteria becomes the new master.

25. The computer readable volatile or non-volatile storage medium of claim 20, the instructions further comprising instructions, when executed by the one or more processors, cause:
upon detecting that a new node
is attempting to join the cluster:
determining whether a clock of the new node conforms to the criteria; and
upon determining that the clock of the new node conforms to the criteria, allowing the new node to join the cluster; and
upon determining that the clock of the new node fails to conform to the criteria, deterring the new node from joining the cluster.

26. The computer readable volatile or non-volatile storage medium of claim 25,
wherein the instructions that cause discovering further comprise instructions that cause:
detecting that the new node has the clock ahead of the master clock in time upon that node joining the cluster;
wherein replacing the master node comprises replacing the master node with the new node.

27. The computer readable volatile or non-volatile storage medium of claim 26,
wherein the instructions that cause replacing the master node, further comprise instructions that cause:
notifying all other nodes in the cluster that the joining node has achieved the master status;
wherein the other nodes function as slave nodes.

28. The computer readable volatile or non-volatile storage medium of claim 17,
wherein the instructions that cause synchronizing times further comprise instructions that cause:
exchanging synchronization messages between the master node and the slave nodes;
based on data in the synchronization messages, calculating a time offset between the clock of a particular slave node and the master clock; and
upon the time offset indicating that the clock of the particular slave node is behind the master clock in time, adjusting the clock of the particular slave node to agree with the master clock.

29. The computer readable volatile or non-volatile storage medium of claim 17,
wherein, upon initial formation of the cluster, a first node to join the cluster becomes the master; and
upon a subsequent node joining the cluster, the subsequent node becomes a slave.

30. The computer readable volatile or non-volatile storage medium of claim 17,
wherein, upon a cluster reboot, the master node before the reboot remains the master node upon performing the reboot.

31. A computer readable volatile or non-volatile storage medium storing instructions encoded therewith which, when executed with one or more processors of a computer system, cause the processors to perform:
monitoring the clock times of the nodes in the cluster in relation to that of a first master node;
discovering that a node of a cluster has a clock time that is ahead of a master clock time of the first master node;
ascertaining that the node that is ahead of the first master clock in time is ahead in time to a degree that satisfies one or more criteria;
in response to ascertaining that the node is ahead, atomically transferring a master status from the first master node to the node ahead thereof in time wherein the node ahead in time becomes a new master node of the cluster and the clock time of the new master node becomes a new master clock time of the cluster;
synchronizing the clock times of other nodes in the cluster with the new master clock time; and
iteratively repeating the transferring step based on the discovering step.

32. The computer readable volatile or non-volatile storage medium of claim 31, wherein ascertaining comprises:
logging the time kept with each clock of nodes in the cluster;
computing a mean cluster time based on the time logged for said each clock of nodes in the cluster; and
determining that the clock time of the node ahead of the pre-existing master clock is within a range of the mean cluster time.

* * * * *